(12) United States Patent
Doenges

(10) Patent No.: US 6,663,280 B2
(45) Date of Patent: Dec. 16, 2003

(54) INSPECTION UNIT

(75) Inventor: Gerhard Doenges, Heidenrod (DE)

(73) Assignee: Heimann Systems GmbH, Wiesbaden (DE)

( * ) Notice: Subject to any disclaimer, the term of this patent is extended or adjusted under 35 U.S.C. 154(b) by 194 days.

(21) Appl. No.: 09/892,781

(22) Filed: Jun. 28, 2001

(65) Prior Publication Data

US 2003/0002630 A1 Jan. 2, 2003

(51) Int. Cl.⁷ .............................................. G01N 23/00
(52) U.S. Cl. ...................................... 378/203; 378/208
(58) Field of Search ............................. 378/203, 208, 378/68, 53

(56) References Cited

U.S. PATENT DOCUMENTS 4,020,346 A * 4/1977 Dennis ......................... 378/57
5,870,449 A   2/1999 Lee et al. .................... 378/57
5,937,028 A * 8/1999 Tybinkowski et al. ...... 378/203

OTHER PUBLICATIONS

Patent Abstracts of Japan, vol. 1999, No. 11, Sep. 30, 1999 & JP 11 160487 A (Ishikawajima Harima Heavy Ind Co Ltd), Jun. 18, 1999; Abstract; Figs. 1, 5, 6.

* cited by examiner

*Primary Examiner*—Louis Arana
(74) *Attorney, Agent, or Firm*—Birch, Stewart, Kolasch & Birch, LLP

(57) ABSTRACT

An inspection apparatus having at an entrance and an exit of a radiation tunnel a radiation-shielding curtain so that no ionized radiation can exit from the inspection unit as a luggage piece or another object to be inspected is passed into or out of the inspection unit. A plurality of light curtains, which are arranged at a spacing, one behind the other, so that the coefficient of fiction ($\mu$) is smaller than when the heavier curtain is provided.

12 Claims, 2 Drawing Sheets

PRIOR ART

INSPECTION UNIT

BACKGROUND OF THE INVENTION

1. Field of the Invention

The present invention relates to an inspection unit having a radiation tunnel with at least one entrance being shielded outwardly by a radiation shielding apparatus.

2. Description of the Background Art

Conventional inspection units have, particularly at an entrance of a radiation tunnel, a radiation-shielding curtain so that when a luggage piece or other object to be inspected is fed into the inspection unit no ionized radiation can exit at this area. A radiation-shielding curtain is respectively mounted therefor at at least a front area of the radiation tunnel of the inspection unit, and also often at a rear area thereof if an exit of the tunnel is open when the object is ejected. Such a radiation-shielding curtain is normally made of a plurality of downwardly-hanging, thick, lead cloths, which are mounted directly adjacent to one another in a row.

Because of the introduction of new x-ray protection regulations and a reduction in radiation threshold values associated therewith, additional shielding measures are necessary in such inspection units. Previously-used lead cloths and curtains of lead-containing material even today often quite substantially impair the flow of luggage pieces by the onset of friction, which depends upon the weight of these curtains. Additional shielding for achieving smaller threshold values mean an increase of this weight because of an increased lead content in the shielding material. A greater weight of the curtain causes, however, a higher resistant force of the curtain that negatively affects the luggage pieces.

SUMMARY OF THE INVENTION

It is therefore an object of the present invention to provide a radiation shielding apparatus in a zone of a radiation tunnel of an inspection unit that meets the new tightened threshold values and, nevertheless, assures an unimpaired transport through the inspection unit.

According to principles of the invention, instead of arranging a single curtain of flexible lead cloths with great weight that cause a significant hindrance of the flow of luggage pieces, a plurality of light curtains are arranged at a particular spacing behind one another, so that the friction force is smaller than when a heavier curtain is employed.

By employing double-staggered curtains no increased resistance force is caused if the spacing of the light-in-weight curtains is approximately the length of the front-most curtain. A minimal spacing of the curtains should, however, not be less than half the length of the front, up-stream, curtain.

In further embodiments of the present invention, it is beneficial for the curtains to be coated with an additional material having a particularly small friction value.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by way of illustration only, and thus, are not limitive of the present invention, and wherein:

A conventional radiation shielding apparatus is shown in. FIG. 1. An inspection unit 10 has respectively at each of an entrance and an exit of a radiation tunnel 12 a shielding curtain 13. Between the two shielding curtains 13 there is a radiation zone 14 in which there is at least one radiation source 15 with at least one detector arrangement 16 directed toward it. A transport system 18, which is part of the inspection unit 10, extends through the radiation tunnel 14. A luggage piece 17, which is to be transported through the inspection unit 10, lies on the transport system 18. During transport, this luggage piece 17 is subjected to a resistance force W of the shielding curtain 13.

This resistance force W is thereby proportional to a tension force S of the shielding curtain 13:

The tension force S is determined according to the following formula $$S = G(1+e),$$

where G is the weight of the shielding curtain 13 (acting at a point), the symbol is the coefficient of friction, and the -symbol is the clinching angle.

Figure 2:
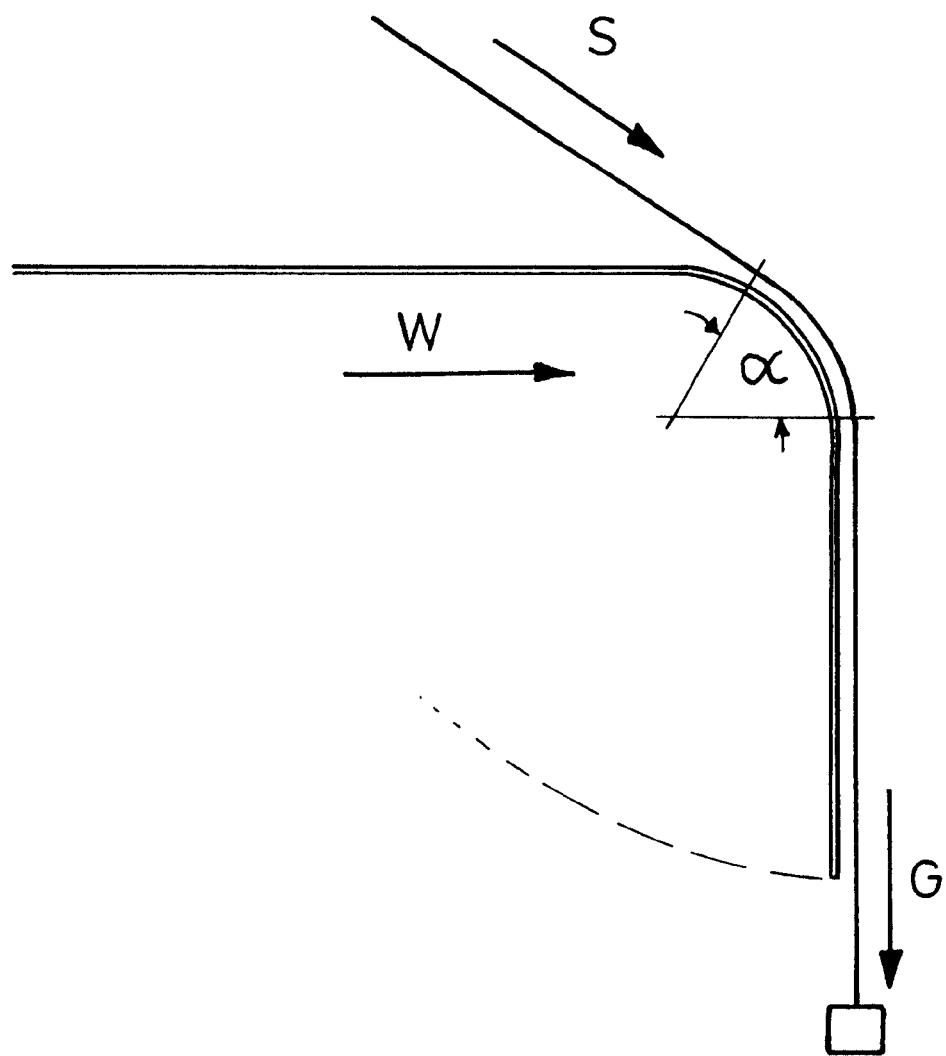
FIG. 2 is a representation of forces on a lead curtain.

FIG. 2 shows this interrelationship diagrammatically.

With a reduction in the radiation threshold values and a corresponding increase in shielding values for the reduced radiation values, according to the conventional art, the weight G of the curtain 13 would have to be increased. If the weight G were only doubled, however, a resistance force W would increase by a factor of 7.39. This would, in turn, greatly influence the flow of the luggage piece 17.

Figure 3:
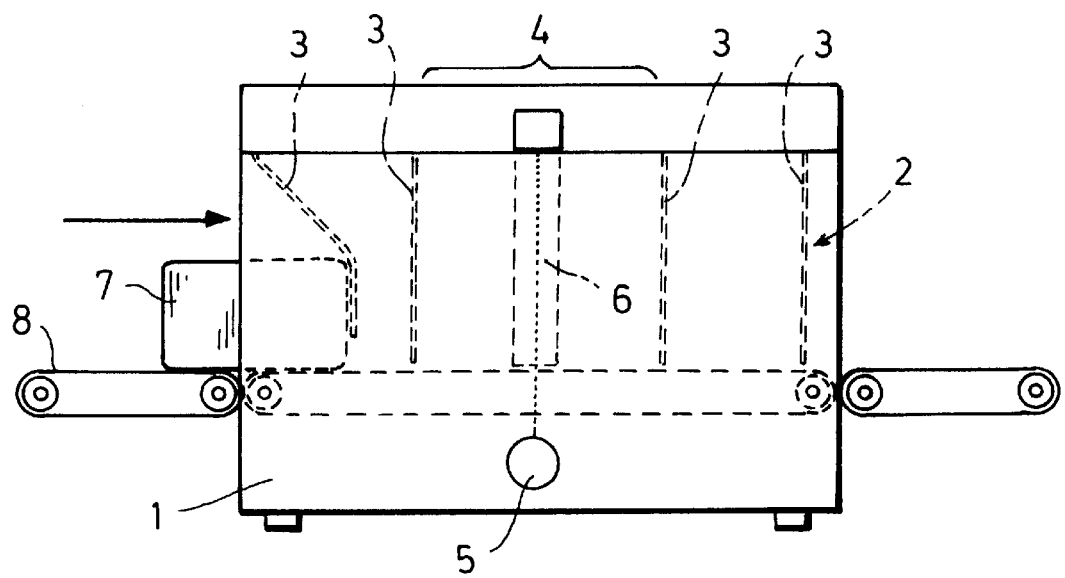
FIG. 3 is a radiation shielding apparatus according to a preferred embodiment of the present invention.

A new type of radiation shielding apparatus in an inspection unit 1 is shown in FIG. 3. The radiation shielding apparatus includes a plurality of light-in-weight lead curtains 3, in this case four, arranged here in pairs with one being spaced behind the other, in the radiation tunnel 2 of the inspection unit 1. The two front functionally-cooperating lead curtains 3 are mounted within the radiation tunnel 2 in front of a radiation zone 4, with the two rear functionally-cooperating lead curtains 3 being behind this radiation zone 4. There is at least one radiation source 5, with at least one detector arrangement 6 directed toward it, in the radiation zone 4. A transport system 8, for example a slide belt conveyer, is included in the inspection unit 1 for transporting a luggage piece 7 in and through the radiation tunnel 2.

Figure 1:
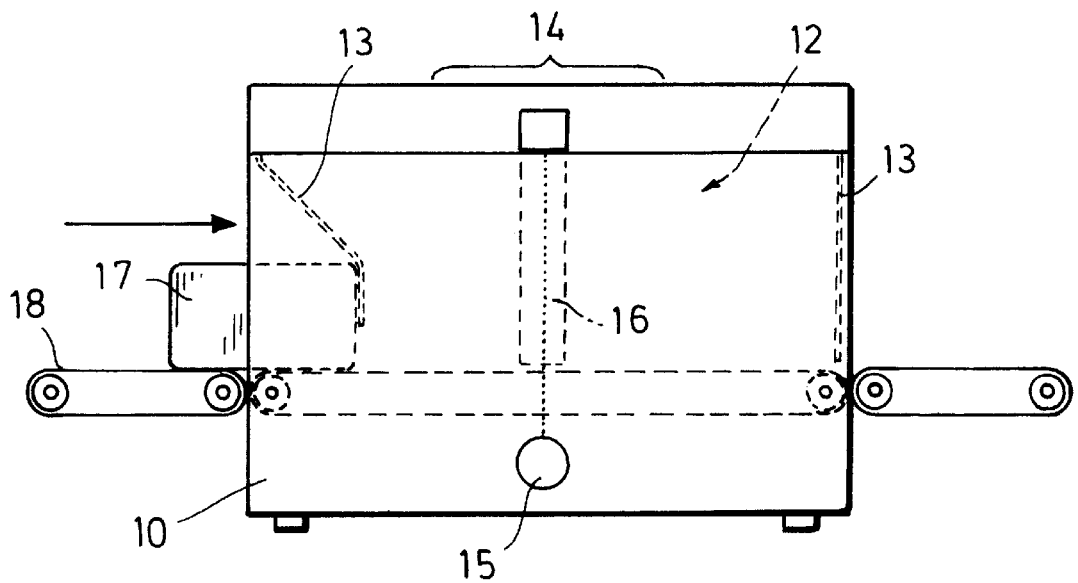
FIG. 1 is a prior-art radiation shielding apparatus in an inspection unit.

Ach of the lead curtains 3 has a substantially smaller individual weight G than does the curtain 13 of FIG. 1, because it is made thinner. The thickness "d" of the lead curtains 3 that determines the weight G is dependent on the intensity of the radiation sources 5, 15 (dose, power) and the radiation values associated therewith. By setting the maximum allowable radiation value, the required shielding of the radiation tunnel 2, 12 is determined. A lead-equivalent value can serve as a prescribed shielding number. If the lead-equivalent value is higher, then the intensity of released radiation is lower. By using only one curtain 13 as shown in FIG. 1, a lead-equivalent value, for example, of 0.35 mm requires an approximately 2 mm thick curtain 13.

By using two or more functionally cooperating lead curtains 3 mounted in front of and behind the radiation zone 4, this thickness of 2 mm can be distributed to the individual lead curtains. If there are, for example, two lead curtains 3 arranged before and after the radiation zone 4, each of the lead curtains 3 then only has a thickness of 1 mm, for three lead curtains 3 each only has a thickness d of 0.66 mm, and for four lead curtains 3 each only has a thickness d of 0.5 mm. Thus, the weight G of the individual lead curtains 3 is reduced, depending on the number included in the inspection unit 1.

Even if the lead-equivalent value is at 0.7 mm, this can be distributed without problems by using additional lead curtains 3. It is, however, also possible within the framework of a permissible resistance force W, to distribute this lead-equivalent value by determining a new thickness value d for the individual lead curtains 3.

In addition to the thickness d, the length L of the lead curtains 3 influences the weight G of the individual lead curtains 3. This length L is mainly determined by a height h of the radiation tunnel 2.

In a particular embodiment the weight G of the second, third, forth and further additional lead curtains 3 can be further reduced by making those lead curtains 3 positioned between the two outermost lead curtains 3 shorter. It is important that the outermost lead curtains 3, those screening the entrance and the exit of the radiation tunnel 2, reach to the transport system 8.

A spacing "a" of the pair-wise mounted lead curtains 3 between one another in the embodiment, is approximately a length L of the respective front lead curtain 3. In this regard, however, the lead curtains 3 lying therebetween should have a minimal spacing $a_{min}$ of approximately no less than half the length L, because otherwise, again, an increase of the resistance force W results when a luggage piece 7 simultaneously comes into contact with multiple lead curtains 3.

In a further enhancement, it is provided that the lead curtains 3 are covered with a material having a particularly small coefficient of friction $\mu$. The individual lead curtain 3 can be of one entire cloth or of slightly overlapping lead cloths.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

I claim:

1. An inspection apparatus comprising:
 a radiation tunnel having an entrance and an exit;
 a conveyor for transporting objects from the entrance toward the exit of the radiation tunnel;
 a radiation zone formed within the radiation tunnel, the radiation zone having a least one radiation source and at least one corresponding detector; and
 at least one pair of shielding curtains positioned adjacent to one another in a transport direction at the entrance of the radiation tunnel, the at least one pair of shielding curtains being spaced from one another at a distance of at least one-half the length of a foremost shielding curtain measured from an upper region of the radiation, tunnel, the upper region being positioned opposite the conveyor.

2. The inspection apparatus according to claim 1, wherein a second pair of shielding curtains is arranged at a spacing, adjacent to one another, at the exit, following the radiation zone in the radiation tunnel.

3. The inspection apparatus according to claim 1, wherein the spacing between the at least one pair of shielding curtains corresponds approximately to the length of the foremost shielding curtain.

4. The inspection apparatus according to claim 1, wherein the shielding curtains positioned between the shielding curtain of the radiation-tunnel entrance and the radiation zone, and the shielding curtain of the radiation-tunnel exit and the radiation zone, are shorter than these outermost shielding curtains.

5. The inspection apparatus according to claim 1, wherein the at least one pair of shielding curtains is additionally covered with a material having a particularly small coefficient of friction.

6. The inspection apparatus according to claim 1, wherein the at least one pair of shielding curtains is structured as thin slightly-overlapping lead cloths.

7. The inspection apparatus according to claim 1, wherein the at least one pair of shielding curtains is structured as thin whole-piece lead curtains.

8. The inspection apparatus according to claim 1, wherein the at least one pair of shielding curtains are flexible.

9. The inspection apparatus according to claim 1, wherein the at least one pair of shielding curtains protect from high-intensity radiation produced from the radiation source.

10. The inspection apparatus according to claim 1, wherein the inspection unit inspects luggage.

11. The inspection apparatus according to claim 1, wherein the at least one pair of shielding curtains has a lead-equivalent value distributed between them, whereby the lead-equivalent value is determined by radiation intensities produced by the at least one radiation source.

12. An inspection unit comprising:
 a radiation tunnel having a radiation zone defined by at least one radiation source and at least one detector arranged towards the radiation source, the radiation tunnel having at least one entrance that is shielded outwardly by a radiation shielding apparatus,
 wherein the radiation shielding apparatus comprises:
 at least two functionally-cooperating curtains arranged at a minimum spacing, one behind the other, wherein a lead-equivalent value, which is needed for the required shielding, is distributed between the two functionally-cooperating curtains, and wherein the minimum spacing between the two functionally-cooperating curtains is at least one-half the length of one of the two functionally-cooperating curtains.

* * * * *